US012491884B2

(12) United States Patent
Samples et al.

(10) Patent No.: US 12,491,884 B2
(45) Date of Patent: Dec. 9, 2025

(54) AUTONOMOUS VEHICLE HAVING MULTIPLE COMPUTE LANE MOTION CONTROL

(71) Applicant: Aurora Operations, Inc., Pittsburgh, PA (US)

(72) Inventors: Michael Samples, Redmond, WA (US); Nitish Thatte, Marshall Township, PA (US); Diana Yanakiev, San Francisco, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/392,914

(22) Filed: Dec. 21, 2023

(65) Prior Publication Data
US 2025/0206313 A1    Jun. 26, 2025

(51) Int. Cl.
*B60W 30/18* (2012.01)
*B60W 60/00* (2020.01)

(52) U.S. Cl.
CPC .. *B60W 30/18163* (2013.01); *B60W 60/0011* (2020.02); *B60W 60/0015* (2020.02); *B60W 2556/40* (2020.02)

(58) Field of Classification Search
CPC .................................................. B60W 60/0011
See application file for complete search history.

(56) References Cited

U.S. PATENT DOCUMENTS

| 11,256,729 | B2 | 2/2022 | Eade et al. | |
|---|---|---|---|---|
| 2021/0107520 | A1* | 4/2021 | Oltmann | B60W 60/0015 |
| 2022/0221868 | A1 | 7/2022 | Mujica et al. | |
| 2022/0379917 | A1* | 12/2022 | Henke | B60W 60/0011 |
| 2023/0041975 | A1* | 2/2023 | Caldwell | B60W 60/0027 |
| 2024/0017738 | A1* | 1/2024 | Vozar | B60W 60/00186 |
| 2024/0017741 | A1* | 1/2024 | Sandberg | G01C 21/3407 |

OTHER PUBLICATIONS

International Search Report and Written Opinion for Application No. PCT/US2024/051921, mailed Jan. 21, 2025, 9 pages.

* cited by examiner

*Primary Examiner* — Imran K Mustafa
(74) *Attorney, Agent, or Firm* — Dority & Manning, P.A.

(57) ABSTRACT

An autonomous vehicle includes a first compute lane, the first compute lane including a first motion planner configured to output a first motion trajectory at a first planning cycle; a second compute lane, the second compute lane including a second motion planner configured to output a second motion trajectory; and one or more processors configured to: obtain data describing the first motion trajectory from the first motion planner; provide the data describing the first motion trajectory to the second motion planner; generate the second motion trajectory by the second motion planner at a second planning cycle based on the data describing the first motion trajectory from the first motion planner; and control an autonomous vehicle in accordance with the first motion trajectory.

16 Claims, 12 Drawing Sheets

AUTONOMOUS VEHICLE HAVING MULTIPLE COMPUTE LANE MOTION CONTROL

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

An autonomous vehicle can navigate through the environment of the autonomous vehicle by generating one or more motion trajectories and controlling the vehicle based on those motion trajectories. Autonomous vehicle control systems can include multiple independent compute lanes, each capable of consuming potentially distinct inputs and reasoning about an environment of an autonomous vehicle. For instance, each compute lane can include a motion planner capable of generating motion trajectories for navigating an autonomous vehicle through its environment. Each compute lane can generate motion trajectories with respect to a unique local frame.

Because each compute lane is independent, the motion trajectories generated by each compute lane can differ as the planned trajectory advances further into the future, in some cases by a significant margin. When the independent compute lanes are configured where a second compute lane operates as a hot standby for a first compute lane, the difference in motion trajectories from the first compute lane and the second compute lane can complicate a smooth transition between compute lanes.

The present disclosure provides for improved transitioning between multiple compute lanes. In one aspect, data describing a first motion trajectory from a first motion planner of a first compute lane is shared between the first motion planner of the first compute lane and a second motion planner of the second compute lane. The shared data describing the first motion trajectory can include data defining initial conditions of the first motion planner for a given timestamp. Additionally or alternatively, the data describing the first motion trajectory can include data describing certain aspects of a state of the first motion planner, such as a decision tree or other data describing or indicating how or why the first motion planner made historical planning decisions. The shared data describing the first motion trajectory can be used to seed or inform the second motion planner such that the second motion planner can operate with respect to similar or the same initial conditions as the first motion planner.

In this manner, the motion trajectories generated by the second motion planner can generally follow, or at least not substantially diverge from, the motion trajectories the first motion planner over at least a near-future time horizon. For example, the second motion trajectory can not deviate from the first motion trajectory by more than some acceptable bound over that near-future time horizon. If the autonomous vehicle control system shifts from the first compute lane to the second compute lane (e.g., in the event that the second compute lane becomes more reliable than the first compute lane), the similar trajectories can prevent a vehicle occupant from experiencing jerk or jolting motions in the vehicle's travel as a result of the transition. After the transition, the second compute lane can independently control the vehicle in place of the first compute lane.

Systems and methods according to example aspects of the present disclosure can provide a number of technical effects and benefits. As one example, systems and methods according to example aspects of the present disclosure can provide for improved robustness of the autonomous vehicle control systems to anomalous operation. For instance, the systems and methods described herein can increase the number of instances where a vehicle can smoothly transition between multiple compute lanes (e.g., in the event of anomalous operation of a compute lane) without interruption to or even recognition by the occupants of the vehicle. As another example, the systems and methods described herein can provide for reduced wear and tear on a vehicle from jerk associated with transitioning between motion trajectories from multiple compute lanes. For instance, the systems and methods described herein can provide that the motion trajectories have relatively similar or nearly-identical portions near the current timestamp, such that the vehicle is not required to perform erratic maneuvers or significantly change course to transition from one motion trajectory to another. In this manner, the performance, robustness, wear characteristics, and passenger comfort of an autonomous vehicle can be improved.

The technology of present disclosure also provides improvement to computing technology, including vehicle computing technology. For instance, according to the present disclosure an autonomous vehicle (AV) control system can include a first compute lane and a second compute lane. The first compute lane can include a first motion planner configured to output a first motion trajectory at a first planning cycle. The second compute lane can include a second motion planner configured to output a second motion trajectory. The AV control system can include one or more processors that are configured to obtain data describing the first motion trajectory from the first motion planner and provide the data describing the first motion trajectory to the second motion planner. The processors can also be configured to generate the second motion trajectory by the second motion planner at a second planning cycle based on the data describing the first motion trajectory from the first motion planner. The processors can control the autonomous vehicle in accordance with the first motion trajectory by providing signals indicative of the trajectory for translation and execution by the vehicle's controls. The AV control system can determine that the autonomous vehicle should transition from the first compute lane to the second compute lane and, in response, control the autonomous vehicle in accordance with the second motion trajectory.

In this manner, the AV control system can intelligently generate alternative trajectories for the autonomous vehicle in advance of detecting a need to transition the vehicle's compute lanes. As a result, the alternative trajectories (e.g., the second motion trajectories) can be computed during the vehicle's typically planned computing cycles, thereby avoiding the need to trigger an emergency response for re-allocating the vehicle's onboard computing resources for alternative trajectory generation. In this way, the technology of the present disclosure allows for more efficient allocation and usage of the vehicle's limited computing resources, while maintaining the high performance of the vehicle's computing system in the event the compute lanes are transitioned. This can improve the overall performance of the autonomous vehicle.

For instance, in an aspect, the present disclosure provides an autonomous vehicle (AV) control system. The AV control system includes a first compute lane, the first compute lane including a first motion planner configured to output a first motion trajectory at a first planning cycle. The AV control system includes a second compute lane, the second compute lane including a second motion planner configured to output a second motion trajectory. The AV control system includes one or more processors configured to: obtain data describing the first motion trajectory from the first motion planner; provide the data describing the first motion trajectory to the second motion planner; generate the second motion trajectory by the second motion planner at a second planning cycle based on the data describing the first motion trajectory from the first motion planner; and control an autonomous vehicle in accordance with the first motion trajectory.

In some implementations, the one or more processors are further configured to: determine to transition from the first compute lane to the second compute lane; and in response to determining to transition from the first compute lane to the second compute lane, control the autonomous vehicle in accordance with the second motion trajectory.

In some implementations, determining to transition from the first compute lane to the second compute lane includes determining whether to accept or reject the second motion trajectory based on a comparison of the first motion trajectory and the second motion trajectory.

In some implementations, the second motion trajectory is accepted if the second motion trajectory is within an acceptable deviation threshold from the first motion trajectory, and the second motion trajectory is rejected if the second motion trajectory is not within the acceptable deviation threshold from the first motion trajectory over one or more planning cycles including the first planning cycle.

In some implementations, the comparison of the first motion trajectory and the second motion trajectory is performed at each timestamp within a prefix time horizon, the prefix time horizon defining an initial portion of each of the first motion trajectory and the second motion trajectory.

In some implementations, the one or more processors are further configured to control the autonomous vehicle to stop based on the second trajectory being rejected one or more times.

In some implementations, providing the data describing the first motion trajectory to the second motion planner includes transforming the data describing the first motion trajectory from a first local frame of the first motion planner to a second local frame of the second motion planner.

In some implementations, transforming the data describing the first motion trajectory from the first local frame of the first motion planner to the second local frame of the second motion planner includes: transforming the data describing the first motion trajectory from the first local frame to an intermediate frame; and transforming the data describing the first motion trajectory from the intermediate frame to the second local frame.

In some implementations, the intermediate frame is or includes a vehicle frame oriented relative to a current pose of the autonomous vehicle.

In some implementations, generating the second motion trajectory by the second motion planner at a second planning cycle based on the data describing the first motion trajectory from the first motion planner includes concatenating a prefix portion of the first motion trajectory to a trajectory generated by the second motion planner, wherein the trajectory generated by the second motion planner begins at an end of the prefix portion.

In some implementations, the data describing the first motion trajectory includes position, velocity, and acceleration data over a full time horizon of the first motion trajectory.

In some implementations, the data describing the first motion trajectory includes a path match data structure, the path match data structure including data descriptive of global path data utilized by the first motion planner in generating the first motion trajectory, the global path data defining a path relative to a global map.

In some implementations, the first compute lane includes one or more first processors of the one or more processors, and the second compute lane includes one or more second processors of the one or more processors, the one or more second processors being independent from the one or more first processors.

In some implementations, the first compute lane utilizes a first set of inputs and the second compute lane utilizes a second set of inputs, wherein the first set of inputs is different from the second set of inputs.

For example, in an aspect, the present disclosure provides a computer-implemented method, including: obtaining data describing a first motion trajectory from a first motion planner configured to output the first motion trajectory at a first planning cycle, the first motion planner associated with a first compute lane; providing the data describing the first motion trajectory to a second motion planner associated with a second compute lane; generating a second motion trajectory by the second motion planner at a second planning cycle based on the data describing the first motion trajectory from the first motion planner; and controlling a vehicle in accordance with the first motion trajectory.

In some implementations, the method further includes determining to transition from the first compute lane to the second compute lane; and, in response to determining to transition from the first compute lane to the second compute lane, controlling the vehicle in accordance with the second motion trajectory.

In some implementations, providing the data describing the first motion trajectory to a second motion planner associated with a second compute lane includes transforming the data describing the first motion trajectory from a first local frame of the first motion planner to a second local frame of the second motion planner.

In some implementations, transforming the data describing the first motion trajectory from the first local frame of the first motion planner to the second local frame of the second motion planner includes: transforming the data describing the first motion trajectory from the first local frame to an intermediate frame; and transforming the data describing the first motion trajectory from the intermediate frame to the second local frame.

In some implementations the data describing the first motion trajectory includes a path match data structure, the path match data structure including data descriptive of global path data utilized by the first motion planner in generating the first motion trajectory, the global path data defining a path relative to a global map.

For instance, in an aspect, the present disclosure provides an autonomous vehicle. The autonomous vehicle includes a first compute lane, the first compute lane including a first motion planner configured to output a first motion trajectory at a first planning cycle. The autonomous vehicle includes a second compute lane, the second compute lane including a second motion planner configured to output a second motion trajectory. The autonomous vehicle includes one or more processors configured to: obtain data describing the first motion trajectory from the first motion planner; provide the data describing the first motion trajectory to the second motion planner; generate the second motion trajectory by the second motion planner at a second planning cycle based on the data describing the first motion trajectory from the first motion planner; and control a vehicle in accordance with the first motion trajectory.

Other example aspects of the present disclosure are directed to other systems, methods, vehicles, apparatuses, tangible non-transitory computer-readable media, and devices for controlling a vehicle, such as an autonomous vehicle.

These and other features, aspects and advantages of various implementations of the present disclosure will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems. As used herein, "about" in conjunction with a stated numerical value is intended to refer to within 20 percent of the stated numerical value, except where otherwise indicated.

Figure 1:
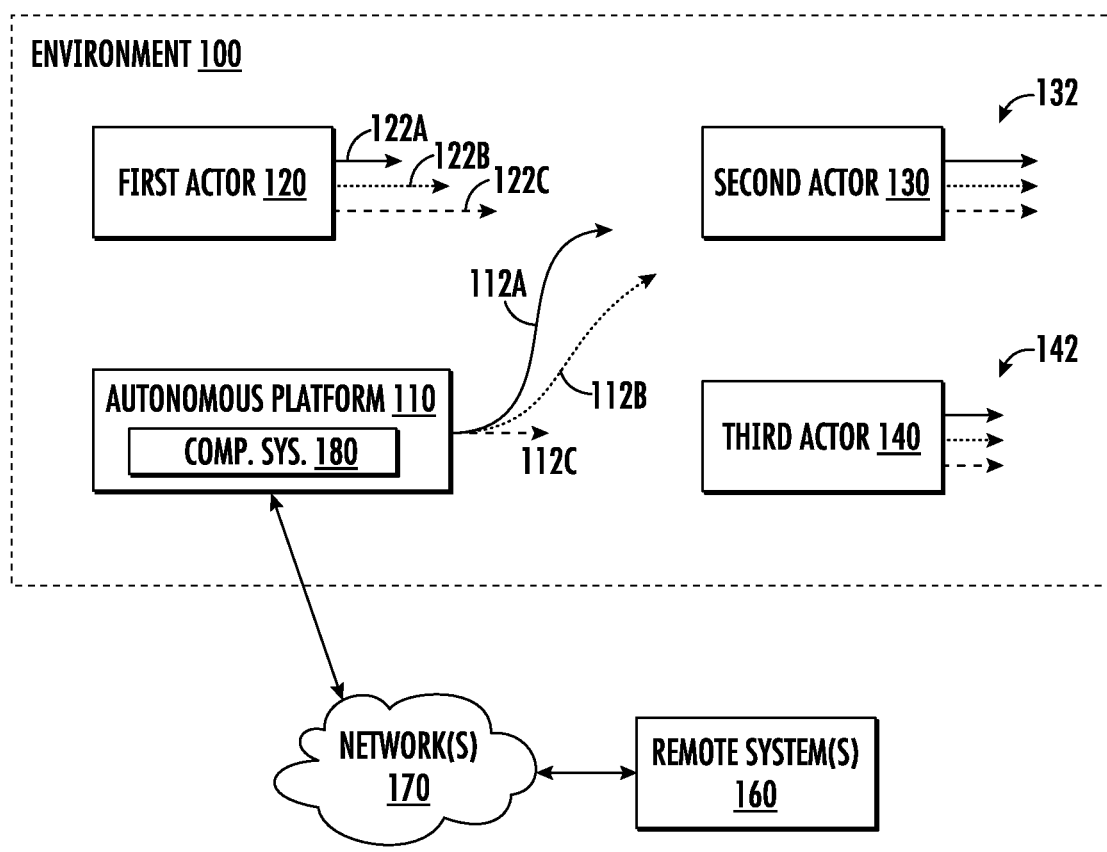
FIG. 1 is a block diagram of an example operational scenario, according to some implementations of the present disclosure.

With reference to FIGS. 1-9, example embodiments of the present disclosure are discussed in further detail. FIG. 1 is a block diagram of an example operational scenario according to example implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 can be or include an indoor environment (e.g., within one or more facilities, etc.) or an outdoor environment. An indoor environment, for example, can be an environment enclosed by a structure such as a building (e.g., a service depot, maintenance location, manufacturing facility, etc.). An outdoor environment, for example, can be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 can be any type of platform configured to operate within the environment 100. For example, the autonomous platform 110 can be a vehicle configured to autonomously perceive and operate within the environment 100. The vehicles can be a ground-based autonomous vehicle such as, for example, an autonomous car, truck, van, etc. The autonomous platform 110 can be an autonomous vehicle that can control, be connected to, or be otherwise associated with implements, attachments, or accessories for transporting people or cargo. This can include, for example, an autonomous tractor optionally coupled to a cargo trailer. Additionally or alternatively, the autonomous platform 110 can be any other type of vehicle such as one or more aerial vehicles, water-based vehicles, space-based vehicles, other ground-based vehicles, etc.

The autonomous platform 110 can be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) can be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s). In particular, according to example aspects of the present disclosure, the autonomous platform 110 can plan and implement a motion trajectory to navigate with respect to the object(s) in the environment 100.

Figure 2A:
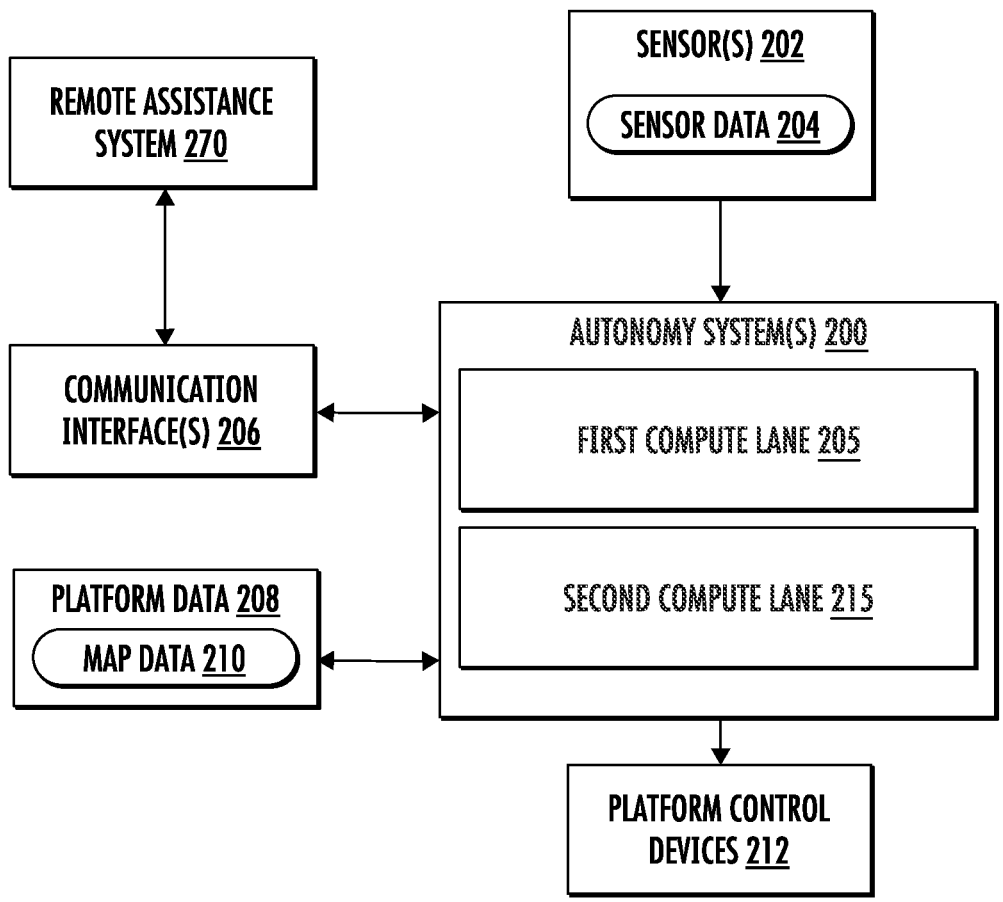
FIG. 2A is a block diagram of an example system, according to some implementations of the present disclosure.

FIG. 2A is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data.

The autonomy system 200 can include different subsystems for performing various autonomy operations. In some implementations, one or more of these different subsystems can be included in one or more compute lanes of the autonomy system 200. For instance, the autonomy system 200 as illustrated in FIG. 2A includes a first compute lane 205 and a second compute lane 215. The first compute lane 205 and the second compute lane 215 can be active, redundant, or alternate such that each of the first compute lane 205 and the second compute lane 215 can control an autonomous platform even in the event that the other compute lane(s) are unavailable (e.g., in the event of anomalous operation). For instance, if the autonomous platform detects anomalous operation associated with one or more subsystem(s) of the first compute lane 205 or the first compute lane 205 itself, then the autonomous platform can switch to the second compute lane 215 to maintain control of the autonomous platform. Although two compute lanes are illustrated in the autonomy system 200 of FIG. 2A, it should be understood that one or more additional compute lanes (e.g., a third compute lane, a fourth compute lane, a fifth compute lane, etc.) can be included in an autonomy system without departing from the present disclosure.

In some implementations, each of the compute lane(s) 205, 215 can operate using a unique set of inputs. For instance, in some implementations, the first compute 205 lane utilizes a first set of inputs and the second compute lane 215 utilizes a second set of inputs. The first set of inputs can be different from the second set of inputs. For instance, each set of inputs can include different or redundant portions of the sensor data 204 from the sensors 202 (e.g., captured using different or redundant sensors 202). As one example, a first compute lane 205 can obtain data from a first sensor of the sensors 202 while the second compute lane 215 can obtain data from a second sensor of the sensors 202. The first sensor and the second sensor can be redundant sensors (e.g., of the same type and/or configuration) or different types or configurations of sensors. As one example, a first LIDAR sensor can produce LIDAR data for the first compute lane 205 and a second LIDAR sensor can produce LIDAR data for the second compute lane 215. However, in some implementations, the same sensor 202 can provide sensor data 204 to multiple compute lanes (e.g., to both first compute lane 205 and second compute lane 215).

Figure 2B:
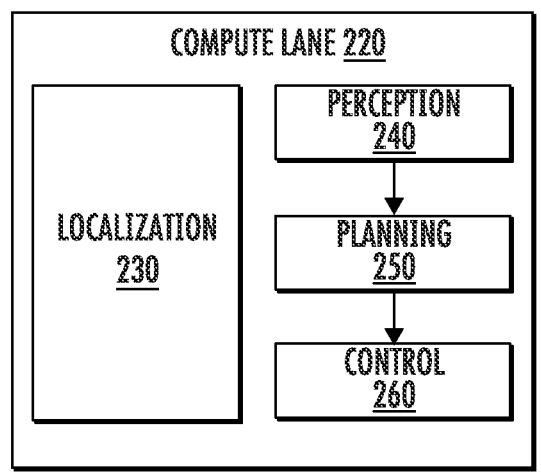
FIG. 2B is a block diagram of an example a compute lane, according to some implementations of the present disclosure.

Each of the compute lane(s) can include subsystems such as, for example, sensors (e.g., some or all of sensors 202), control devices (e.g., platform control devices 212), and computing systems. For instance, in some implementations, the subsystems can include a localization system, a perception system, a planning system, a control system, or other suitable computing system(s). As one example, FIG. 2B depicts a compute lane 220 according to some implementations of the present disclosure. The compute lane 220 can be, for example, the first compute lane 205 or the second compute lane 215. Additionally, in implementations where the autonomy system includes greater than two compute lanes, the compute lane 220 can be an additional compute lane. Localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. Although the example compute lane 220 includes each of a localization system 230, a perception system 240, a planning system 250, and a control system 260, it should be understood that more or fewer subsystems can be included in a compute lane without departing from the present disclosure. For instance, in some implementations, a compute lane can include a respective planning system that receives data from a common localization system, planning system, or other subsystem that is shared with one or more other compute lanes. As another example, in some implementations, a common control system] can receive motion trajectories from one or more planning systems associated with respective compute lanes and determine which motion trajectory to implement to control the autonomous platform.

The autonomy system 200 can be implemented by one or more onboard computing system(s) each having one or more processors and one or more memory devices. The one or more memory devices can store instructions executable by the one or more processors to cause the one or more processors to perform operations or functions associated with the subsystems. For instance, the computing resources of the autonomy system 200 can be shared among its subsystems, or a subsystem can have a set of dedicated computing resources. Furthermore, each compute lane (e.g., the first compute lane 205 and the second compute lane 215) can, in some implementations, have one or more independent computing resources, such as independent processor(s) and/or independent memory device(s) (e.g., including independent memory stacks). For instance, the independent resource(s) can not be shared among multiple compute lanes and can perform only operations associated with a given compute lane. Furthermore, the resource(s) of the first compute lane 205 can operate independently of the resource (s) of the second compute lane 215. For instance, the resource(s) of the first compute lane 205 can be able to operate normally even in the event of abnormal operation of resource(s) of the second compute lane 215, and vice versa.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment can be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. Each of the sensor(s) 202 can be associated with (e.g., configured to provide the sensor data 204 to) one or more compute lanes. The sensor data 204 can include image data (e.g., 2D camera data, video data, etc.), RADAR data, LIDAR data (e.g., 3D point cloud data, etc.), audio data, or other types of data. In some implementations, the autonomy system 200 (e.g., a compute lane 220) can obtain input from additional types of sensors 202, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally or alternatively, the map data 210 can include sparse map data (e.g., lane graphs, etc.). In some implementations, the sensor data 204 can be fused with or used to update the map data 210 in real-time.

The autonomy system 200 (e.g., the compute lane 220) can include a localization system 230 (e.g., a pose estimation system), which can provide an autonomous platform with an understanding of its location and orientation in an environment (its "pose"). In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.), also referred to as "global pose," or relative position (e.g., respecting an initial position of the autonomous vehicle, etc.), also referred to as "local pose." For instance, the local pose can be defined relative to a coordinate frame or frame of reference established with respect to the initial position of the vehicle and updated as the vehicle moves relative to its initial position. The local pose can be consistent over short timeframes, such as timeframes on the order of several seconds. The local pose can be periodically refreshed. For instance, periodically refreshing the local pose can help mitigate the effects of pose drift over time. The global pose can instead be defined relative to a global coordinate system, such as a tiled map grid.

The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system (e.g., a global navigation satellite system (GNSS) such as GPS, BeiDou, GLONASS, Galileo, etc.), radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 (e.g., the compute lane 220) can include a perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 (e.g., a compute lane 220) can include a planning system 250 (which can also be referred to as a "motion planner" or "motion planning system"), which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy can be a set of discrete decisions (e.g., yield to actor, reverse yield to actor, merge, lane change) that the autonomous platform makes. The strategy can be selected from a plurality of potential strategies. The selected strategy can be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

In some implementations, the planning system 250 can perform planning and forecasting over one or more planning cycles. For instance, at each planning cycle, the planning system 250 can generate a motion trajectory and/or associated information about actors such as a predicted trajectory of the actors. For example, the planning system 250 can generate a first motion trajectory at a first planning cycle and a second motion trajectory at a second planning cycle. Each planning cycle can be associated with a timestamp. Furthermore, the planning cycles can be synchronized across multiple subsystems of the planning system 250. For instance, the planning cycles can synchronize the sensors 202 (e.g., and the sensor data 204), data from the localization system 230, and/or data from the perception system 240. For instance, during the first planning cycle, a first set of sensor data 204 and other suitable data associated with a first timestamp can be used by the localization system 230, the perception system 240, or the planning system 250 to generate a first trajectory associated with that first timestamp. At a subsequent time step, the planning system can then use updated sensor data 204 associated with the subsequent time step to generate a second trajectory. The second trajectory can additionally be based on an internal state of the planning system 250, which can be consistent across multiple timesteps.

To implement selected motion plan(s), the autonomy system 200 (e.g., the compute lane 220) can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger can be an alert, an error signal, a map feature, a request, a location, a traffic condition, a road condition, etc.

After initiating the session, the autonomy system 200 can provide context data to the remote assistance system 270. The context data can include sensor data 204 and state data of the autonomous platform. For example, the context data can include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning subsystem 250. Additionally or alternatively, assistive signal(s) can be considered by the autonomy system 200 as suggestive inputs for consideration in addition to other received data (e.g., sensor inputs, etc.).

The autonomy system 200 can be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
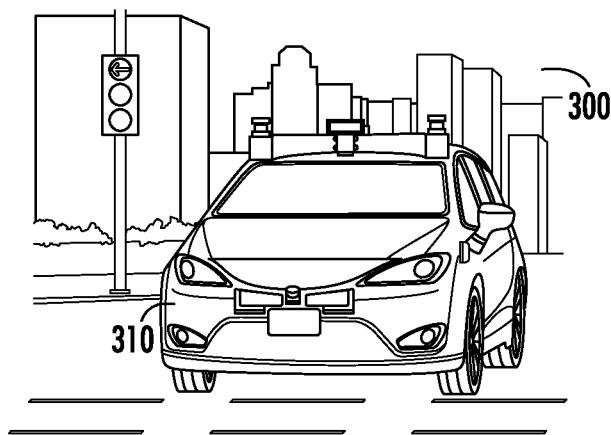
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
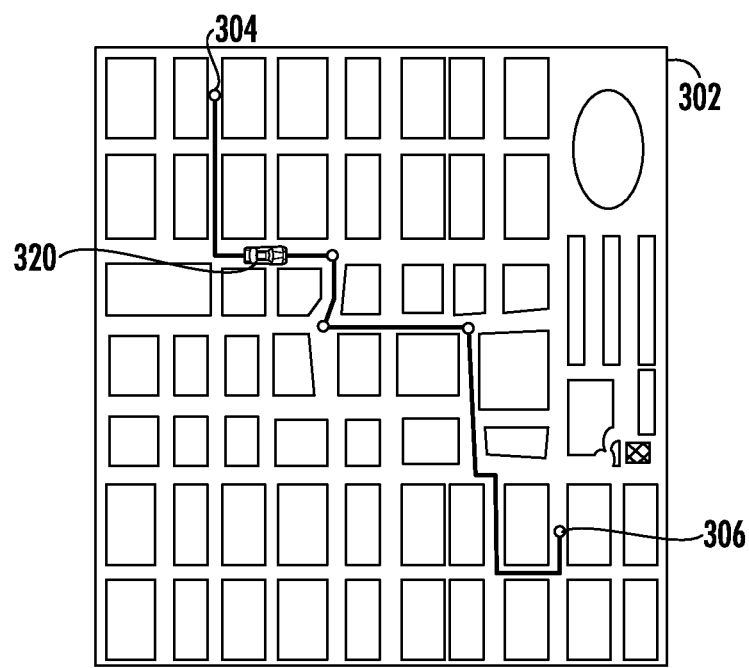
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
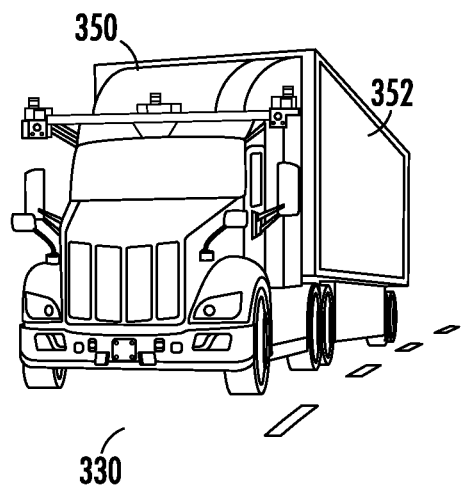
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
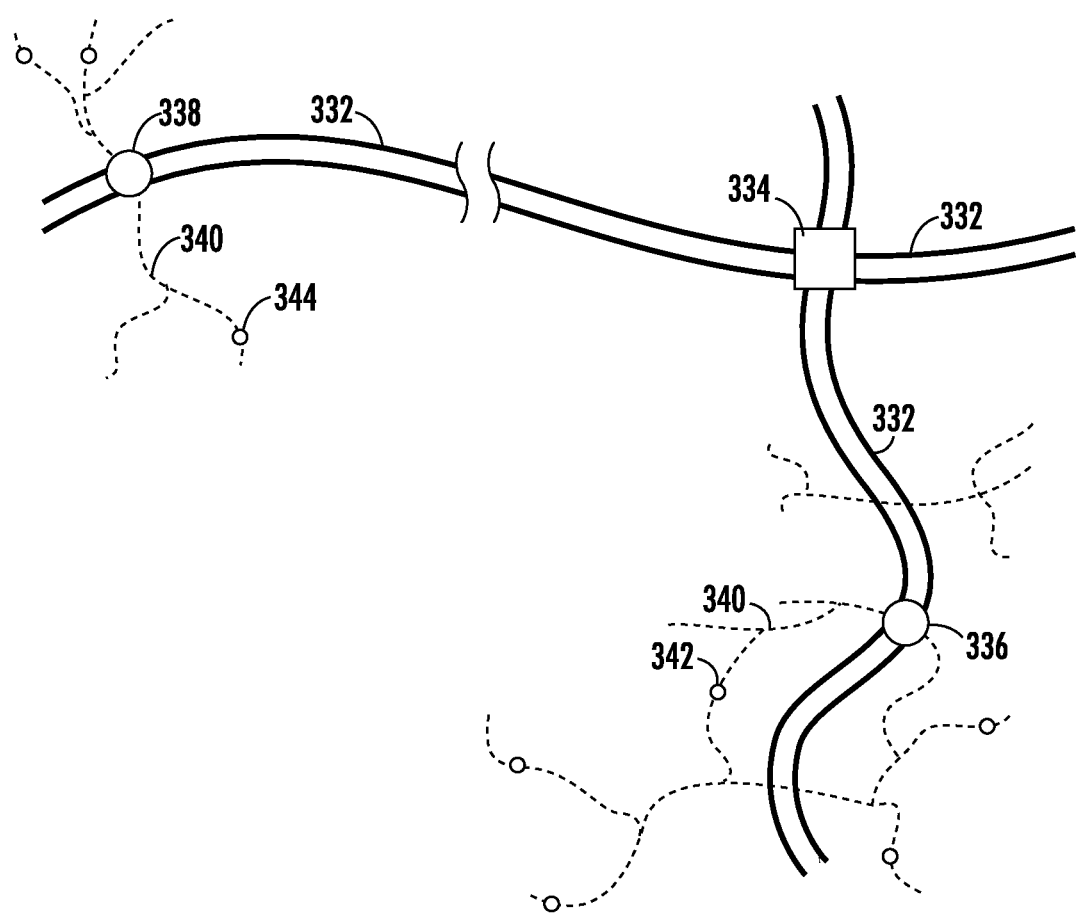
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the performance of an autonomous vehicle controlled at least in part using autonomy system(s) 200, systems and methods according to example aspects of the present disclosure can provide for improved robustness of the autonomous vehicle control systems to anomalous operation. As used herein, "anomalous operation" can refer to operation of a vehicle control system or its subsystems during which one or more anomaly conditions are present. Example anomaly conditions include unreliable output, loss in function of a module or system, unavailability of outputs, conflicts between two or more data sources, internal flags from a module or system indicating anomalous operation, or any other suitable anomaly conditions.

The systems and methods described herein can be implemented to generate motion trajectories that have relatively similar or nearly-identical portions near the current timestamp, such that the vehicle is not required to perform erratic maneuvers or significantly change course to transition from one motion trajectory to another. In this manner, the performance, robustness, and passenger comfort of an autonomous vehicle can be improved.

Figure 4A:
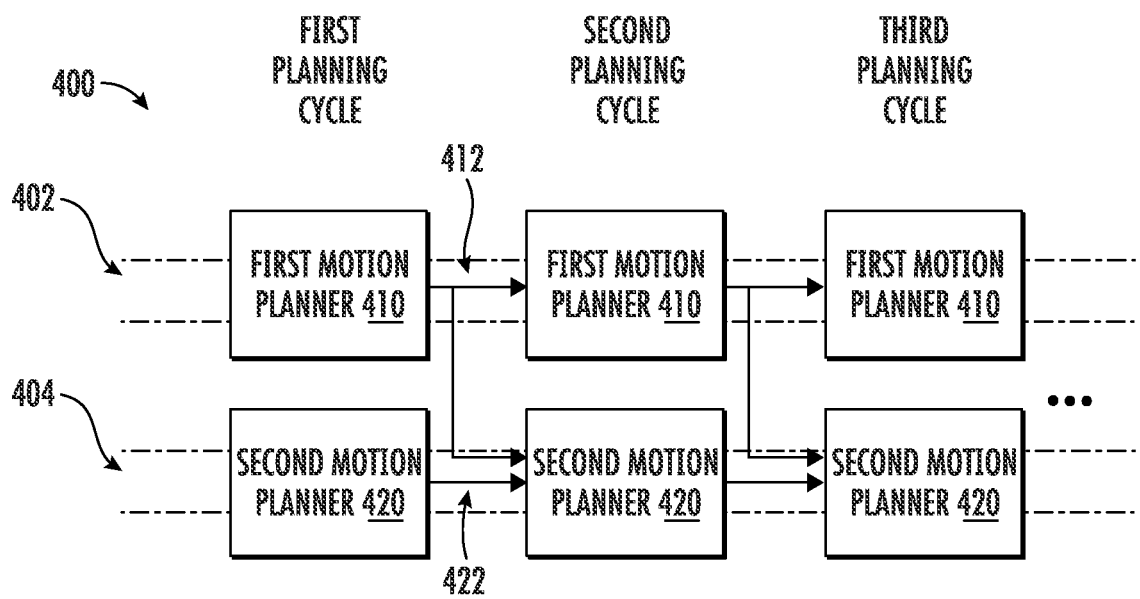
FIG. 4A is a block diagram of an example autonomous vehicle control system according to some implementations of the present disclosure.

FIG. 4A is a block diagram of an example autonomous vehicle control system 400 according to some implementations of the present disclosure. The system 400 can include a first motion planner 410 and a second motion planner 420. The first motion planner 410 can be associated with a first compute lane 402. The second motion planner 420 can be associated with a second compute lane 404. The first compute lane 403 can be independent of the second compute lane 404. A compute lane can include, for example, one or more processors, one or more memory devices, a perception system, a planning system, or any other suitable subsystems or computing resources. In some cases, the first compute lane 403 may share one or more components with the second compute lane 404. For example, the first compute lane 403 and the second compute lane 404 may both receive data from the same sensor (e.g., LIDAR). In other cases, the first compute lane 403 and the second compute lane 404 may not share any of the same components.

The first motion planner 410 and the second motion planner 420 can each be configured to output motion trajectories at each of a first planning cycle, a second planning cycle, a third planning cycle, and so on. The second planning cycle can occur at a time subsequent to the first planning cycle, the third planning cycle can occur at a time subsequent to the second planning cycle, and so on. In some implementations, the first motion planner 410 can output a trajectory at each planning cycle that is computed independently of the trajectories generated by the second motion planner 420, at each planning cycle. For instance, the first motion planner 410 and the second motion planner 420 can compute respective motion trajectories without knowledge of the motion trajectory from the other motion planner.

Additionally or alternatively, in some implementations, the motion trajectory from one of the first motion planner 410 or the second motion planner 420 can be based on a shared motion trajectory or portion thereof from the other of the first motion planner 410 or the second motion planner 420. For instance, in some implementations, the first motion planner 410 can share data describing at least a portion of a first motion trajectory over a prefix time horizon (e.g., a prefix trajectory region of the first motion trajectory). The second motion planner 420 can generate a second motion trajectory over a greater time horizon than the prefix time horizon. The second motion trajectory can be generated based on the portion of the first motion trajectory over the prefix time horizon from the first motion planner 410. For instance, in some implementations, the shared data describing the first motion trajectory, such as the prefix trajectory region, can be used as an initial condition for the second motion planner 420. As one example, the prefix trajectory region can be used to seed an initial state of the second motion planner 420. The second motion planner 420 can then generate the second motion trajectory using the portion of the first motion trajectory as an initial condition.

According to example aspects of the present disclosure, the first motion planner 410 can store state data 412 over consecutive planning cycles. The state data 412 can represent an internal state of the first motion planner 412. For instance, the state data 412 can encode information about decisions or strategies generated by the first motion planner 410 for navigating an environment of an autonomous platform. Similarly, the second motion planner 420 can store state data 422 over consecutive planning cycles that represents an internal state of the second motion planner 420. According to example aspects of the present disclosure, at least a portion of the state data 412 from the first motion planner 410 at a given planning cycle can be shared with the second motion planner 420 for use at a subsequent planning cycle. For instance, state data 412 from the first planning cycle can be shared with the second motion planner 420 at a second planning cycle, and so on.

Figure 4B:
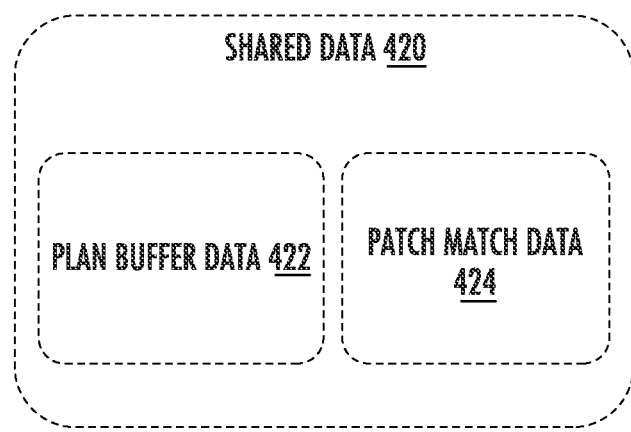
FIG. 4B is a block diagram of example shared data, according to some implementations of the present disclosure.

FIG. 4B is a block diagram of example shared data 420 according to some implementations of the present disclosure. The shared data 420 can be, for example, the state data 412 of FIG. 4A or other suitable data. The shared data 420 can describe a motion trajectory. The motion trajectory may include, for example, a position, heading, and longitudinal and lateral velocity, acceleration, and jerk of the vehicle at a plurality of time steps. The shared data 420 may additionally encode information utilized by a motion planner for generating a motion trajectory at a planning cycle. In particular, in some implementations, the shared data can include plan buffer data 422 having a plan buffer data structure. The plan buffer data structure can encode data descriptive of one or more historical trajectories generated by a motion planner, such as the first motion planner 410. For instance, the plan buffer data structure can describe decisions (e.g., relative to actors) or strategies utilized for generating the one or more historical trajectories. Additionally or alternatively, the shared data 420 can include path match data 424 having a path match data structure. The path match data structure can include data descriptive of global path data utilized by a motion planner (e.g., the first motion planner 410) in generating a motion trajectory. In particular, the global path data can define a path relative to a global map. As one example, the global path data can describe predefined paths that are encoded relative to a tiled global map, such as the map data 210 of FIG. 2A.

Figure 5A:
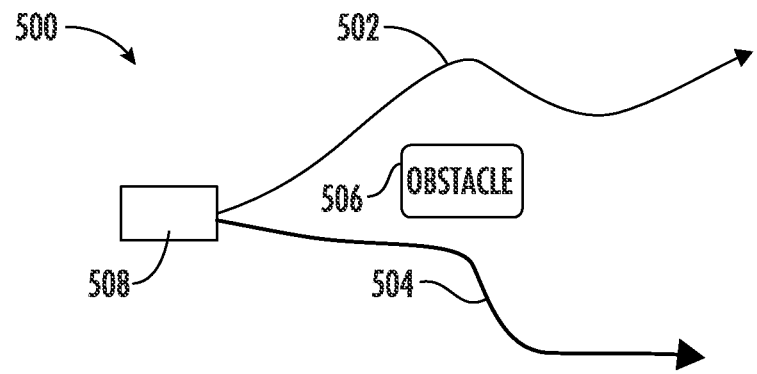
FIG. 5A is a diagram of an example scenario, according to some implementations of the present disclosure.

FIG. 5A is a diagram of an example scenario 500. The scenario 500 describes a first trajectory 502 and a second trajectory 504 for navigating an autonomous vehicle 508 around an obstacle 506 (e.g., an object or actor). The first trajectory 502 can be produced by a first motion planner 410 and the second trajectory 504 can be produced by a second motion planner 420. The autonomous vehicle 508 can generally implement one of the first trajectory 502 or the second trajectory 504 to navigate through its environment. It should be appreciated that both the first trajectory 502 and the second trajectory 504 can be, independently, valid trajectories that successfully navigate around the obstacle 506. However, as evident from FIG. 5A, there is a significant degree of separation between the first trajectory 502 and the second trajectory 504. It should be apparent that, if the autonomous vehicle 508 is navigating according to the first trajectory 502 and the first motion planner 410 experiences anomalous operation while navigating the first trajectory 502, forcing the autonomous vehicle 508 to switch to the second motion planner 420, it can be difficult or impossible for the autonomous vehicle 508 to smoothly transition to the second trajectory 504 as the second trajectory 504 is substantially different from the first trajectory 502 and, in the example of FIG. 5A, follows an entirely opposite side of the obstacle 506.

Figure 5B:
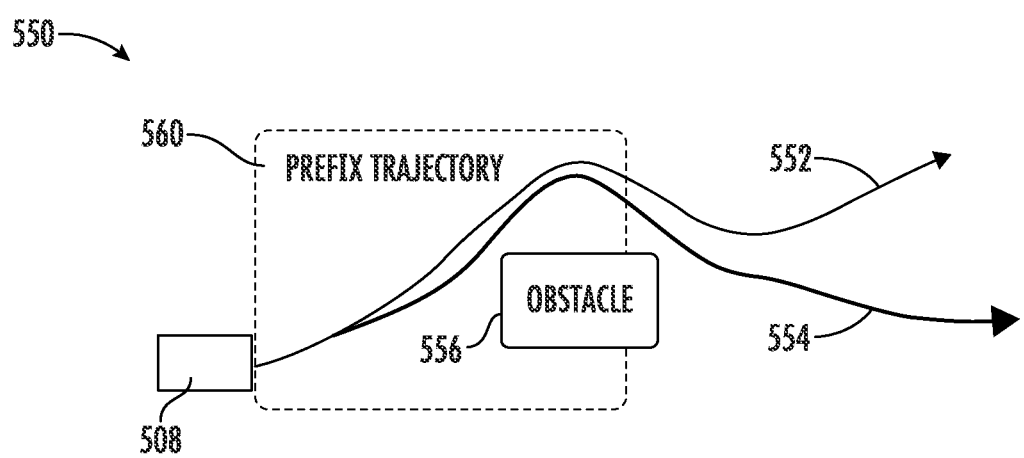
FIG. 5B is a diagram of an example scenario, according to some implementations of the present disclosure.

FIG. 5B is a diagram of another example scenario 550 according to some implementations of the present disclosure. In FIG. 5B, the first motion planner 410 can share data describing a first trajectory 552 with a second motion planner 420. After the second motion planner receives the data describing the first trajectory 552, the second motion planner 554 can determine a second trajectory 554. Because the second motion planner has knowledge of the first trajectory 552, the second trajectory 554 can better follow the first trajectory 552, despite being determined by an independent motion planner and an independent compute lane. For example, the first trajectory 552 and second trajectory 554 may be substantially similar or identical over a prefix trajectory region 560 near the current timestamp and current position of the vehicle. For instance, the prefix trajectory region 560 can be or can include one or more waypoints associated with future time stamps over the prefix time horizon. As one example, the prefix time horizon can include waypoints associated with less than about 3 seconds into the future, such as less than about 2.5 seconds into the future, such as less than about 2 seconds into the future, such as less than about 1.5 seconds into the future, such as less than about 1 second into the future, such as less than about 0.5 seconds into the future, such as less than about 0.1 seconds into the future, such as between about 0 seconds and about 3 seconds into the future. The first trajectory 552 and the second trajectory 552 can be substantially similar over the prefix trajectory region 560 if, for each future time stamp in the prefix time horizon, the waypoints for the first trajectory 552 and the second trajectory 554 do not differ by greater than an acceptable deviation threshold.

In some implementations, the first trajectory 552 and the second trajectory 554 may be identical over the prefix trajectory region 560. For example, the second motion planner 420 can first generate candidate trajectories that begin at the end of the prefix trajectory region 560. The second motion planner 420 can then rank the candidate trajectories and select one for execution (e.g., as described in reference to planning system 250 of FIG. 2). The second motion planner 420 can then concatenate the prefix of the first trajectory 552 to the selected candidate trajectory to generate the second trajectory 554. In this way, the prefix trajectory region of the first trajectory 552 may be identical to the prefix trajectory region of the second trajectory 554.

In other implementations, the first trajectory 552 and the second trajectory 554 may merely be similar over the prefix trajectory region 560. For example, the second motion planner 420 may generate full-length candidate trajectories that include the prefix trajectory region. Candidate trajectories that do not have sufficient overlap with the first trajectory 552 in the prefix trajectory region may be discarded. Therefore, the prefix trajectory region of the candidate trajectory that is ultimately selected (i.e., the second trajectory 554) may be very similar but not necessarily identical to the prefix trajectory region of the first trajectory 552.

The prefix trajectory region 560 can represent a region (e.g., a prefix time horizon) where the vehicle can have adequate time to transition between independent motion planners without experiencing substantial anomalous operation. If the vehicle shifts to the second motion trajectory 554 from the first motion trajectory 552 while within the prefix trajectory region 560, the vehicle may not need to perform irregular maneuvers or jerky motions to recover its operation, in notable contrast to the example of FIG. 5A. Outside of the prefix trajectory region 560, the trajectories 552, 554 can diverge without negatively affecting operation of the vehicle. In this manner, the vehicle can provide a smoother ride experience to occupants and cargo of the vehicle in the event of anomalous operation. The prefix trajectory region 560 can include waypoints associated with less than about 3 seconds into the future, such as less than about 2.5 seconds into the future, such as less than about 2 seconds into the future, such as less than about 1.5 seconds into the future, such as less than about 1 second into the future, such as less than about 0.5 seconds into the future, such as less than about 0.1 seconds into the future, such as between about 0 seconds and about 3 seconds into the future.

Figure 6:
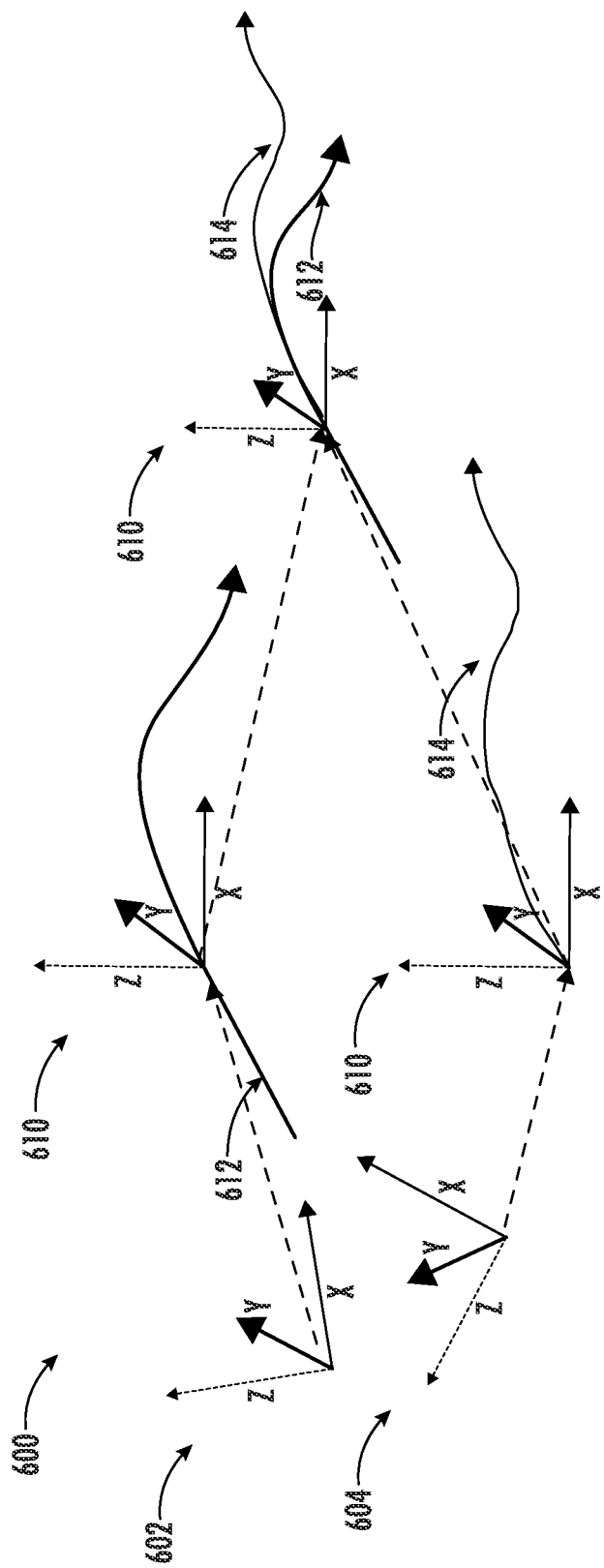
FIG. 6 is a diagram illustrating transitioning between coordinate frames, according to some implementations of the present disclosure.

FIG. 6 is a diagram 600 illustrating transitioning between coordinate frames according to some implementations of the present disclosure. In particular, frame 602 can represent a first local coordinate frame, such as a first local frame of a first motion planner 410. For instance, the first local frame 602 can be established by the first motion planner 410. Trajectories generated by the first motion planner 410 can be described relative to the first local frame 602. The first local frame 602 can be established by the first motion planner based on initial conditions of the first motion planner, such as an initial location and/or orientation of the vehicle when the first motion planner is initialized. As one example, the first local frame 602 can include a first heading and a first origin, which can be established by a first motion planner.

Frame 604 can represent a second local coordinate frame, such as a second local frame of a second motion planner 420. To communicate data regarding the generated motion trajectories between the first and second motion planners 410, 420 and other subsystems of the autonomous vehicle control system (e.g., including other motion planners), the system can transform the motion trajectories to frame 610 representing another coordinate frame. This other coordinate frame can include the local frame of another motion planner or an intermediate frame, such as a vehicle frame. The vehicle frame can be a coordinate frame established relative to a current pose of the vehicle. For example, an origin of the vehicle frame can be a current position of the vehicle. Similarly, the axes of the vehicle frame can be established relative to a current heading of the vehicle.

The first trajectory 612 can be transformed from the frame 602 to the frame 604 by first transforming it into intermediate frame 610 (e.g., the vehicle frame). A transformation between the frame 602 and the intermediate frame 610 may be determined by comparing the pose of the vehicle in the frame 602 to the pose of the vehicle in the intermediate frame 610. That transformation can be used to transform the first trajectory 612 into the intermediate frame 610. A transformation between the frame 604 and the intermediate frame 610 may be determined by comparing the pose of the vehicle in the frame 604 to the pose of the vehicle in the intermediate frame 610. That transformation can be used to transform the transformed trajectory 612 (i.e., in the intermediate frame 610) to the frame 604.

Figure 7:
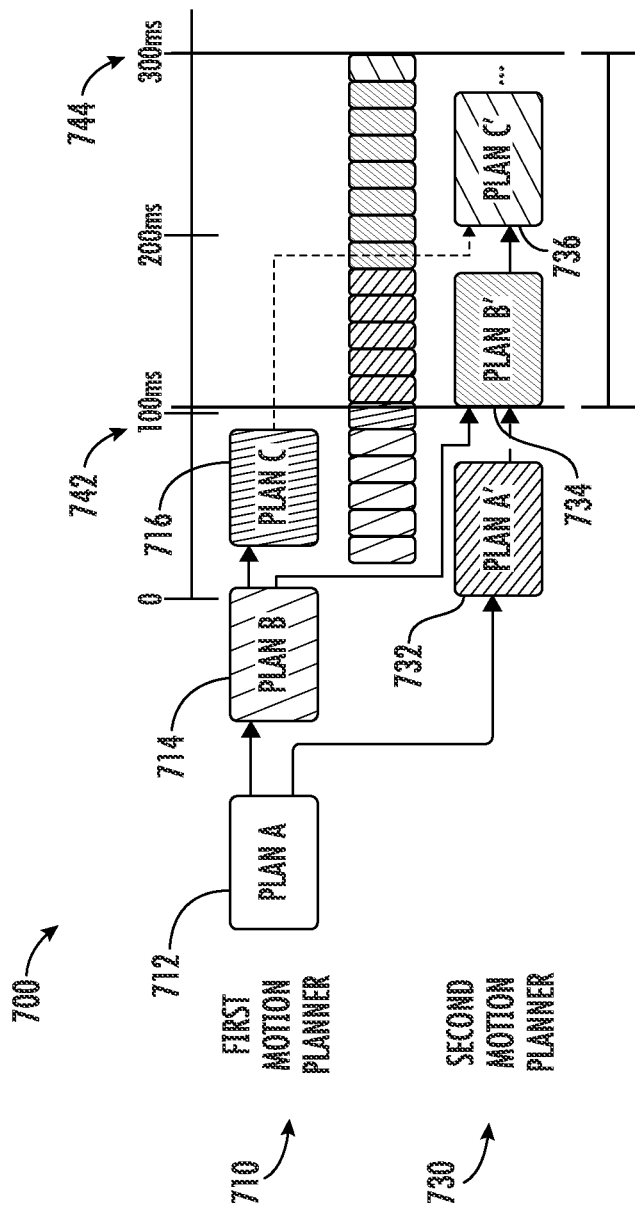
FIG. 7 is an example timing diagram, according to some implementations of the present disclosure.

FIG. 7 is an example timing diagram 700 according to some implementations of the present disclosure. The timing diagram 700 illustrates outputs (e.g., motion plans or motion trajectories) of a first motion planner 710 and a second motion planner 730. For instance, the first motion planner 710 can output motion plan A 712, motion plan B 714, and motion plan C 716, each at subsequent planning cycles. The second motion planner 730 can output motion plan A' 732 based on shared data from motion plan A 712, motion plan B' 734 based on shared data from motion plan B 714, and motion plan C' 736 based on shared data from motion plan C 736. In the example timing diagram 700, the first motion planner 710 experiences anomalous operation from first time 742 to second time 744. The detected anomalous operation causes the autonomous vehicle to transition to motion plan A' 732 in lieu of executing motion plan C due to the potential anomaly in any motion trajectories from the first motion planner 710. In this manner, the autonomous vehicle can avoid disruptions in autonomous functionality while additionally avoiding anomalous operation of the first motion planner 710.

According to example aspects of the present disclosure, portions of the motion plan A' 732 in a prefix time horizon (e.g., over the next 100 ms, 500 ms, etc.) can be similar to or identical to the motion plan C 716, such that the vehicle can implement motion plan A' 732 in place of motion plan C 716 without experiencing significant jerk or acceleration. For instance, one or more waypoints of motion plan C 716 and motion plan A' 732 at timestamps from about 100 ms after the first time 742 can have relatively small distances (e.g., less than about 0.25 m) between the waypoints.

Figure 8:
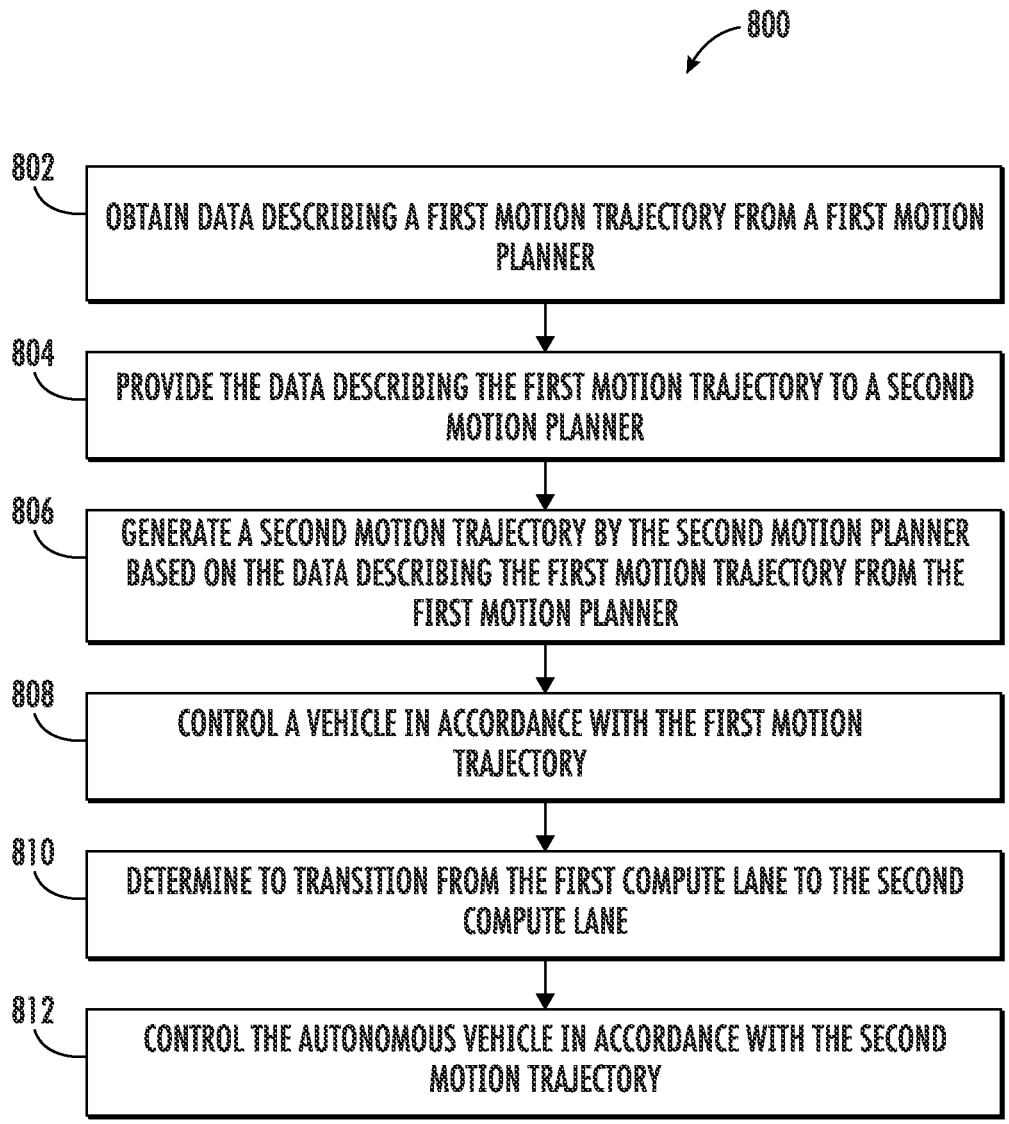
FIGS. 8-10 are flowcharts of example methods for transitioning compute lanes and controlling an autonomous vehicle, according to some implementations of the present disclosure.

FIG. 8 is a flowchart diagram of a method 800 for controlling an autonomous vehicle according to some implementations of the present disclosure. One or more portion(s) of the method 800 can be implemented by the computing systems described with reference to the other figures (e.g., autonomous platform 110, vehicle computing system 180, remote system(s) 160, a system of FIGS. 4A, 7, 9, etc.). Each respective portion of the method 800 can be performed by any (or any combination) of one or more computing devices. Moreover, one or more portion(s) of the method 700 can be implemented on the hardware components of the device(s) described herein (e.g., as in FIGS. 1, 2A-2B, 4A, 7, 9, etc.), for example, to control an autonomous vehicle.

For instance, the method 800 described herein can be implemented by an autonomous vehicle (AV) control system. The AV control system can include a first compute lane and a second compute lane. The first compute lane can include a first motion planner configured to output a first motion trajectory at a first planning cycle. The second compute lane can include a second motion planner configured to output a second motion trajectory (e.g., at a second planning cycle). The first compute lane can include one or more first processors of the processor(s) of the overall AV control system. The second compute lane can include one or more second processors of the processor(s) of the overall AV control system. Additionally, the AV control system may include a controller interface. The controller interface can convert trajectories output by the first motion planner and the second motion planner to one or more vehicle control actions that, when implemented by one or more vehicle control devices, can control the vehicle.

At least some of the one or more second processors of the second compute lane can be independent from at least some of the one or more first processors of the first computer lane. For instance, the independent processor(s) can not be shared among multiple compute lanes and can perform only operations associated with a given compute lane. Furthermore, the first processor(s) of the first compute lane can operate independently of the second processor(s) of the second compute lane. For instance, the first processor(s) of the first compute lane can be able to operate normally even in the event of abnormal operation of the second processor(s) of the second compute lane, and vice versa.

Each of the first and second compute lane(s) can operate using a unique set of inputs. For instance, the first compute lane can utilize a first set of inputs and the second compute lane can utilize a second set of inputs. The first set of inputs can be different from the second set of inputs. By way of example, each set of inputs can include different or redundant portions of the sensor data from sensors (e.g., captured using different or redundant sensors). As one example, a first compute lane can obtain data from a first sensor while the second compute lane can obtain data from a second sensor. The first sensor and the second sensor can be redundant sensors (e.g., of the same type and/or configuration) or different types or configurations of sensors. As one example, a first LIDAR sensor can produce LIDAR data for the first compute lane and a second LIDAR sensor can produce LIDAR data for the second compute lane. However, in some implementations, the same sensor can provide sensor data to multiple compute lanes (e.g., to both first compute lane and second compute lane).

The method 800 provides example operations for transitioning between the first and second compute lanes and controlling an autonomous vehicle accordingly.

At 802, the method 800 can include obtaining data describing a first motion trajectory from a first motion planner. For instance, the first motion trajectory can include a planned path for the autonomous vehicle to change lanes to avoid an obstruction in a road such as a pothole. The pothole can be located within the current lane of travel of the autonomous vehicle.

At 804, the method 800 can include providing the data describing the first motion trajectory to a second motion planner. As described herein, the first motion planner can be associated with a first compute lane. Furthermore, the second motion planner can be associated with a second compute lane. The first compute lane and the second compute lane can be active, redundant, or alternate such that each of the first compute lane and the second compute lane can control an autonomous vehicle even in the event that the other compute lane(s) are unavailable (e.g., in the event of anomalous operation). For instance, if the autonomous vehicle detects anomalous operation associated with one or more subsystem(s) of the first compute lane or the first compute lane itself, then the autonomous vehicle can switch to the second compute lane to maintain control of the autonomous vehicle.

The data describing the first motion trajectory can encode information utilized by the first motion planner in generating the first motion trajectory at the first planning cycle. A trajectory can be represented by one or more waypoints. The waypoints can be encoded with information associated with the motion of the autonomous vehicle. For instance, a waypoint can include information descriptive of a vehicle heading/turning instructions, speed, acceleration/deceleration, braking force, etc. for controlling the autonomous vehicle to avoid the pothole in its lane. This can include, for example, performing a lane change maneuver.

In some implementations, the data describing a motion trajectory includes plan buffer data having a plan buffer data structure. The plan buffer data structure can encode data descriptive of one or more historical trajectories generated by the first motion planner. For instance, the plan buffer data structure can describe decisions (e.g., relative to actors) or strategies utilized for generating the one or more historical trajectories.

Additionally or alternatively, the data can include path match data having a path match data structure. As described herein, the path match data structure can include data descriptive of global path data utilized by the first motion planner in generating the first motion trajectory. In particular, the global path data can define a path relative to a global map. As one example, the global path data can describe predefined paths that are encoded relative to a tiled global map. The global path data can encode lanes, roads, or other structures present in the environment. However, the global path data can be generated using historical data and might not represent a current state of the environment. For example, a pothole can have formed in the road surface between the time the global path data is captured and the time the vehicle navigates its environment using the global path data.

By providing the data describing the first motion trajectory to the second motion planner, the autonomous vehicle control system can provide similar initial conditions of the first motion planner to the second motion planner. This can allow the second motion planner to generate a second motion trajectory that is similar to the first motion trajectory for timestamps in the near future.

The data describing the first motion trajectory can be associated with a first planning cycle. In particular, the first motion planner and the second motion planner can perform planning and forecasting over multiple planning cycles. At each planning cycle, the planner(s) can generate a motion trajectory and/or associated information about actors such as a predicted trajectory of the actors. For example, the planner(s) can generate a motion trajectory at a first planning cycle and a new motion trajectory at a second planning cycle. Each planning cycle can be associated with a timestamp.

The planning cycles can be synchronized across multiple subsystems of the autonomous vehicle. For instance, the planning cycles and timestamps can be synchronized across sensors (e.g., and sensor data), data from localization systems, data from perception systems, or other suitable systems. For instance, during the first planning cycle, a first set of sensor data and other suitable data associated with a first timestamp can be used by the localization system, the perception system, or the planner(s) to generate a motion trajectory associated with that first timestamp. At a subsequent time step, the planner(s) can then use updated sensor data associated with the subsequent time step to generate an updated motion trajectory. The updated motion trajectory can be based on an internal state of the planner(s), which can be consistent across multiple timesteps.

Figure 9:
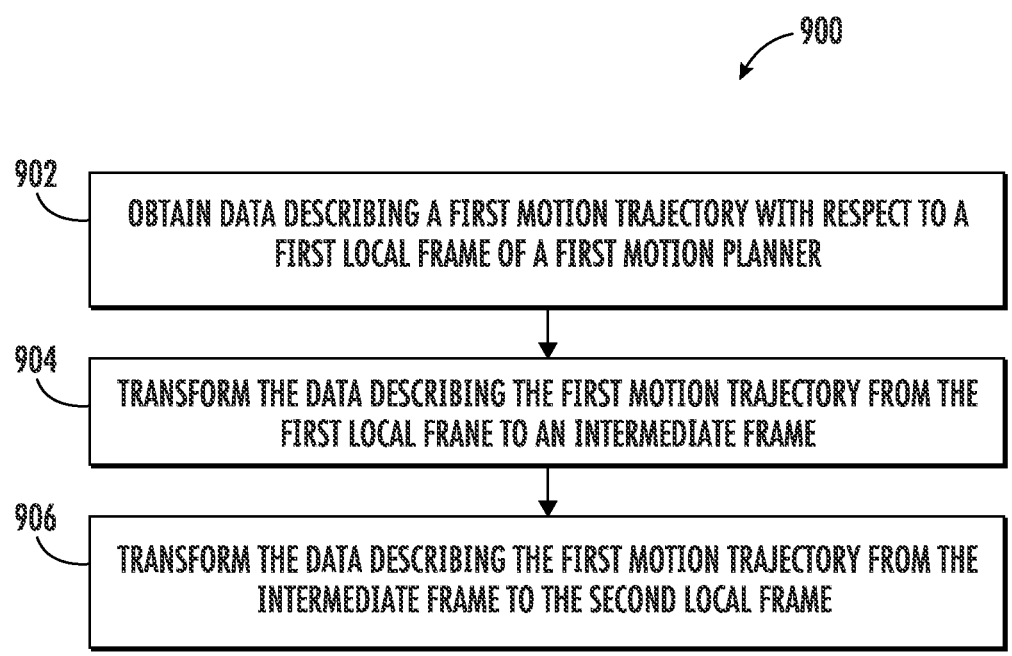

In some implementations, providing the data describing the first motion trajectory to the second motion planner can include transforming the data describing the first motion trajectory across reference frames. This can include transforming the data from a first local frame of the first motion planner to a second local frame of the second motion planner. For instance, a computing system can transform data describing a first motion trajectory from a first local frame of a first motion planner to a second local frame of a second motion planner. For instance, each of the first motion planner and the second motion planner can operate with respect to a specific local frame established by the respective motion planners. The first local frame and the second local frame can be any suitable reference frames, such as coordinate frames (e.g., X, Y, Z coordinate frames) having any suitable origin or orientation. In some implementations, the data can be transformed to one or more intermediate frames. FIG. 9 provides an example method 900 for transforming motion trajectories using an intermediate frame. The method 900 can include, at 902, obtaining data describing a first motion trajectory with respect to a first local frame of a first motion planner. For instance, the data describing a first motion trajectory can encode information utilized by the first motion planner in generating the first motion trajectory at a first planning cycle.

At 904, the method 900 can include transforming the data describing the first motion trajectory from the first local frame to an intermediate frame. For instance, the first trajectory can be transformed from the first local frame to a second local frame by first transforming it into an intermediate frame. The intermediate frame can be any suitable frame, such as, for example, a vehicle frame. The vehicle frame can be oriented relative to a current pose of the vehicle (e.g., a current pose from a localization system). Furthermore, in some implementations, the vehicle frame can be oriented relative to a compass direction, direction of travel, or other suitable orientation. For instance, in some implementations, a transformation between the first local frame and the intermediate frame may be determined by comparing the pose of the vehicle in the frame to the pose of the vehicle in the intermediate frame. That transformation can be used to transform the first trajectory into the intermediate frame.

Furthermore, the method 900 can include, at 906, transforming the data describing the first motion trajectory from the intermediate frame to a second local frame. The second local frame can be a local frame established by a second motion planner (e.g., of a second compute lane). A transformation between the second local frame and the intermediate frame may be determined by comparing the pose of the vehicle in the second local frame to the pose of the vehicle in the intermediate frame. That transformation can be used to transform the transformed trajectory (i.e., in the intermediate frame) to the second local frame.

Returning to FIG. 8, at 806, the method 800 can include generating the second motion trajectory by the second motion planner based on the data describing the first motion trajectory from the first motion planner. The second motion trajectory can be associated with a second planning cycle. As described herein, the second planning cycle can occur at a time subsequent to the first planning cycle during which the first motion planner generate the first motion trajectory. Because the data describing the first motion trajectory is shared between the first motion planner of the first compute lane and the second motion planner of the second compute lane, the second motion trajectories generated by the second motion planner can generally follow, or at least not substantially diverge from, the first motion trajectories the first motion planner over at least a near-future time horizon. For example, an initial portion of the second motion trajectory can follow a similar path around a pothole as the first motion trajectory.

In some implementations, the data describing the first motion trajectory can be or can include a prefix trajectory region of the first motion trajectory. The prefix trajectory region can be or can otherwise describe a portion of the first motion trajectory over a prefix time horizon. The prefix time horizon can be a time horizon that is less than a (e.g., complete) time horizon of the first motion trajectory. For example, the prefix trajectory region can be some portion of the first motion trajectory that is less than the entire motion trajectory. Additionally, the prefix trajectory region can be at a nearest time horizon (e.g., including one or more timestamps that immediately follow a current time and/or a current planning cycle).

In some implementations, the second motion trajectory can be generated by the second motion planner based on the portion of the first motion trajectory over the prefix trajectory region. For example, the second motion planner can first generate candidate trajectories that begin at the end of the prefix trajectory region. The second motion planner can then rank the candidate trajectories and select one for execution (e.g., as described in reference to planning system 250 of FIG. 2). The second motion planner can then concatenate the prefix of the first trajectory (e.g., the portion of the first trajectory over the prefix time horizon) to the selected candidate trajectory to generate the second motion trajectory. In this way, the prefix trajectory region of the first trajectory may be identical to the prefix trajectory region of the second trajectory.

In other implementations, the first trajectory and the second trajectory may merely be similar over the prefix trajectory region. For example, the second motion planner may generate full-length candidate trajectories that include the prefix trajectory region. Candidate trajectories that do not have sufficient overlap with the first trajectory in the prefix trajectory region may be discarded. Therefore, the prefix trajectory region of the candidate trajectory that is ultimately selected (i.e., the second trajectory) may be very similar but not necessarily identical to the prefix trajectory region of the first trajectory.

The second motion trajectory can not deviate from the first motion trajectory by more than some acceptable bound over that near-future time horizon. As one example, waypoints of the trajectories can be synchronized at common timestamps. A distance between the waypoints at each timestamp can be measured, such as by computing the hypotenuse of a triangle defined by the differences in each coordinate of each waypoint. The total similarity of the trajectories can be the sum of the distance between each respective waypoint. The second motion trajectory can be accepted if the sum of the distances between the waypoints of the second motion trajectory and the first motion trajectory are within an acceptable deviation threshold. Additionally or alternatively, the second motion trajectory can be rejected if the second motion trajectory is not within the acceptable deviation threshold from the first motion trajectory over one or more planning cycles including the first planning cycle.

In this way, in the event the autonomous vehicle control system shifts from the first compute lane to the second compute lane (e.g., in the event that the second compute lane becomes more reliable than the first compute lane), the similar trajectories can prevent a vehicle occupant from experiencing jerk or jolting motions in the vehicle's travel as a result of the transition.

The second motion planner can continually generate the second motion trajectory even while the first motion planner is controlling the vehicle, such that the second motion trajectory is ready in the event that a transition becomes necessary. After the transition, the second compute lane can independently control the vehicle in place of the first compute lane, if called upon to do so.

At 808, the method 800 can include controlling the autonomous vehicle in accordance with the first motion trajectory. As one example, the vehicle can be controlled using one or more control systems based on the first motion trajectory while the first compute lane undergoes expected operation. The autonomous vehicle control system can control the autonomous vehicle by providing one or more signals (or other data communications) that describe the first motion trajectory. As described herein, this includes providing information descriptive of waypoint locations, speed parameters, acceleration parameters, braking parameters, steering/heading parameters, etc. The signals (or other data communications) can be provided to the autonomous vehicle's control system(s) or an interface thereof.

The control system(s) can, for example, translate the first motion trajectory into instructions for the appropriate control devices (e.g., acceleration control, brake control, steering control, etc.). By way of example, the control system(s) can translate a selected motion trajectory into instructions to adjust a steering component (e.g., a steering angle) by a certain number of degrees, apply a certain magnitude of braking force, increase/decrease speed, etc. In some implementations, the control system(s) can communicate with the platform control devices through communication channels including, for example, one or more data buses (e.g., controller area network (CAN), etc.), onboard diagnostics connectors (e.g., OBD-II, etc.), or a combination of wired or wireless communication links. The platform control devices can send or obtain data, messages, signals, etc. to or from the autonomy system(s) (or vice versa) through the communication channel(s).

At 810, the method 800 can include determining to transition from the first compute lane to the second compute lane. For instance, the vehicle can determine to transition from the first compute lane to the second compute lane in the event that the first compute lane experiences a condition for doing so such as an anomalous operation.

Figure 10:
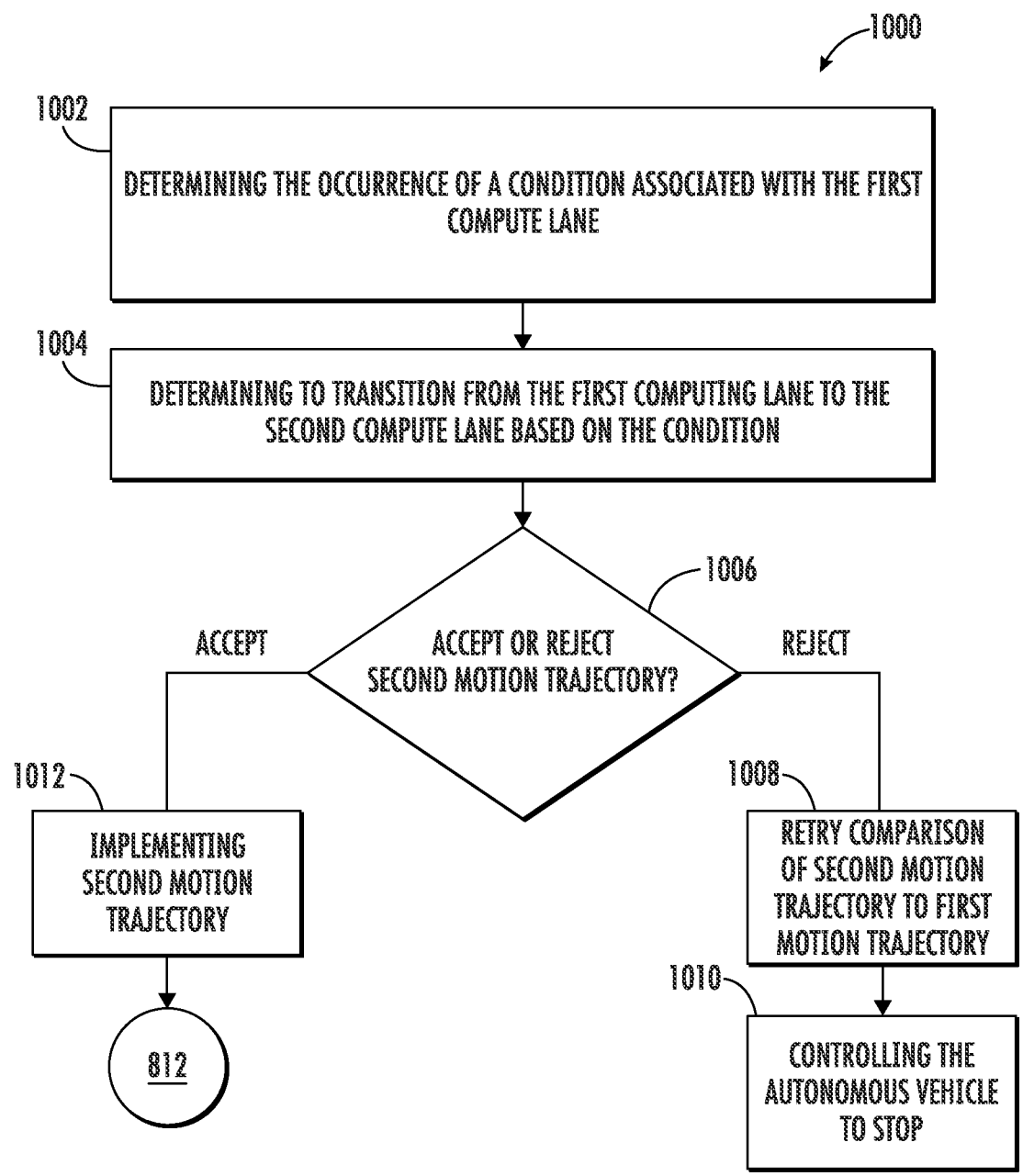

FIG. 10 provides an example method 1000 for transition computing lanes. At 1002, the method 1000 can include determining the occurrence of a condition associated with the first compute lane. For example, the autonomous vehicle can include a module that monitors the performance of the first motion planner and/or the motion trajectories produced therefrom. The module can detect whether the first motion planner is experiencing anomalous operation. The first compute lane can experience anomalous operation if an output from the first compute lane becomes unavailable or unpublished, if the output of the first compute lane falls outside a reliability threshold or below a confidence level, if the first compute lane reports anomalous operation through a message, flag, or other communication, or another suitable means, or for any other suitable manner of determining anomalous operation.

At 1004, the method 1000 can include determining to transition from the first compute lane to the second compute lane based on the condition. For example, in the event that anomalous operation is detected, the autonomous vehicle control system can determine that a condition associated with the first motion planner has occurred. Thus, the autonomous vehicle control system can determine to transition from the first computing lane/motion planner to the second compute lane/motion planner.

In some implementations, the method 1000 includes evaluating the second motion trajectory to confirm whether to indeed transition the compute lanes, at 1006. For instance, determining to transition compute lanes can include determining whether to accept or reject the second motion trajectory based on a comparison of the first motion trajectory and the second motion trajectory. For instance, the second motion trajectory can be accepted if the second motion trajectory is within an acceptable deviation threshold from the first motion trajectory, and the second motion trajectory can be rejected if the second motion trajectory is not within the acceptable deviation threshold from the first motion trajectory over one or more planning cycles including the first planning cycle. This can include, for example, the autonomous vehicle control system determining whether to transition from the first compute lane to the second compute lane includes determining whether to accept or reject the second motion trajectory based on a comparison of the first motion trajectory and the second motion trajectory. For example, at the point in time at which the first compute lane begins anomalous operation, the autonomous vehicle control system can compare the first motion trajectory and the second motion trajectory to determine whether it is possible or reasonable to transition from following the first motion trajectory to following the second motion trajectory (e.g., without experiencing jerk or performing an undesirable maneuver when avoiding the pothole).

The comparison can relate to whether the first motion trajectory and the second motion trajectory are similar enough to smoothly transition. For instance, in some implementations, the second motion trajectory can be accepted if the second motion trajectory is within an acceptable deviation threshold from the first motion trajectory. Additionally or alternatively, the second motion trajectory can be rejected if the second motion trajectory is not within the acceptable deviation threshold from the first motion trajectory over one or more planning cycles including the first planning cycle.

The one or more planning cycles can not include the entirety of the first or second motion trajectories. For instance, in some implementations, the comparison of the first motion trajectory and the second motion trajectory can be performed at each timestamp within a prefix time horizon, the prefix time horizon defining an initial portion of each of the first motion trajectory and the second motion trajectory. As described herein, the prefix time horizon can represent an amount of time where the vehicle can smoothly transition between the motion trajectories, even if the trajectories eventually diverge beyond the acceptable deviation threshold. As an example, in some implementations, the prefix time horizon can represent an amount of time up to less than about 3 seconds into the future, such as less than about 2.5 seconds into the future, such as less than about 2 seconds into the future, such as less than about 1.5 seconds into the future, such as less than about 1 second into the future, such as less than about 0.5 seconds into the future, such as less than about 0.1 seconds into the future, such as between about 0 seconds and about 3 seconds into the future.

The evaluation of the second motion trajectory can be performed by a validity watchdog of the autonomous vehicle. The validity watchdog can be programmed to evaluate the validity of a motion trajectory. This can include comparing a motion trajectory to another. For example, as described herein, the autonomous vehicle control system can transform the previous active trajectory (e.g., the first motion trajectory) into the coordinate frame of the second motion trajectory. Based this transformation, the validity watchdog can reject the second motion trajectory due to a larger than acceptable deviation.

In the event of the rejection, at 1008, the autonomous vehicle control system (e.g., the validity watchdog) can re-evaluate the second motion trajectory. This can include retying the comparison of the second motion trajectory to the first motion trajectory. In the event the second motion trajectory is rejected more than a threshold number of times (e.g., 2, 3, etc.), confirmation input from the validity watchdog can elapse. In response, the autonomous vehicle can control the autonomous vehicle to stop based on the second trajectory being rejected one or more times, at 1010.

In the event that the second motion trajectory is accepted, the autonomous vehicle control system can implement the second motion trajectory at 1012. For example, returning to FIG. 8, at 812, the example method 800 can include controlling the autonomous vehicle in accordance with the second motion trajectory. In response to determining to transition from the first compute lane to the second compute lane (e.g., and acceptance of the second motion trajectory), the method 800 can include controlling the vehicle in accordance with the second motion trajectory. As similarly described herein, the autonomous vehicle control system can control the autonomous vehicle by providing one or more signals (or other data communications) that describe the second motion trajectory. As described herein, this may include providing information descriptive of waypoint locations, speed parameters, acceleration parameters, braking parameters, steering/heading parameters, etc. The signals (or other data communications) can be provided to the autonomous vehicle's control system(s) or an interface thereof, which can adjust the motion of the autonomous vehicle accordingly.

The autonomous vehicle can continue to control the vehicle in accordance with the second motion trajectory until a current trip of the vehicle is completed. Additionally or alternatively, in some implementations, the vehicle can revert to the first compute lane when the anomalous operation has ceased.

Figure 11:
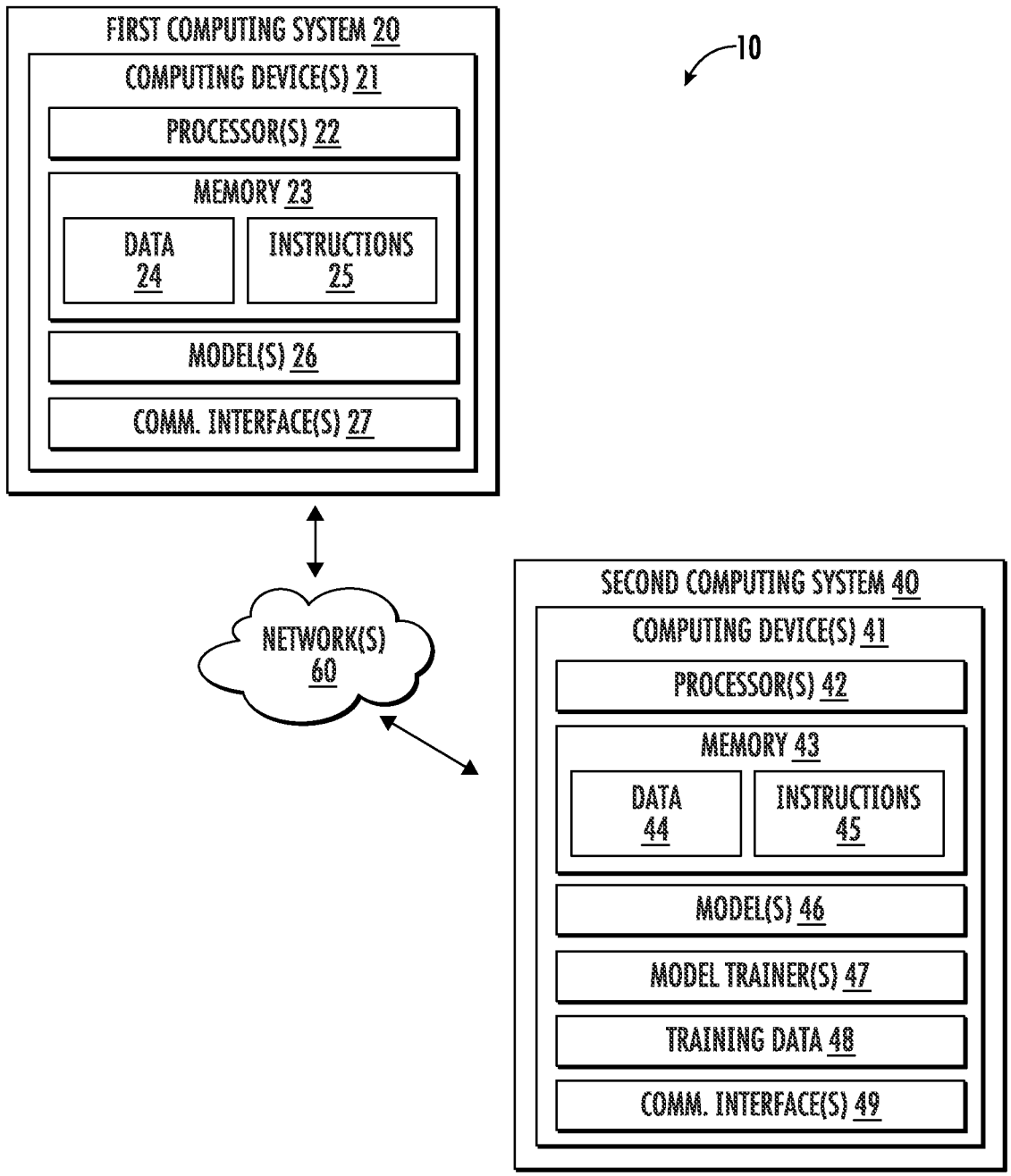
FIG. 11 is a block diagram of an example computing system, according to some implementations of the present disclosure.

FIG. 11 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for controlling an autonomous vehicle.

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., a compute lane, such as a compute lane 220 including the localization system 230, the perception system 240, the planning system 250 (compute lanes thereof), the control system 260, or a combination thereof, etc.). In other implementations, the first computing system 20 can not be located onboard an autonomous platform. The first computing system 20 can include one or more distinct physical computing devices 21.

The first computing system 20 (e.g., the computing device (s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, data associated with individual compute lanes, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200 (e.g., a compute lane 220), including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, detect conditions for transitioning compute lanes, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with individual compute lanes, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.).

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 11 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 can not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. An autonomous vehicle (AV) control system, comprising:
 a first compute lane, the first compute lane comprising a first motion planner configured to output a first motion trajectory at a first planning cycle;
 a second compute lane, the second compute lane comprising a second motion planner configured to output a second motion trajectory; and
 one or more processors configured to:
  obtain data describing the first motion trajectory from the first motion planner;
  provide the data describing the first motion trajectory to the second motion planner;
  generate the second motion trajectory by the second motion planner at a second planning cycle based on the data describing the first motion trajectory from the first motion planner;
  control an autonomous vehicle in accordance with the first motion trajectory;
  determine to transition from the first compute lane to the second compute lane based on an anomaly condition indicative of anomalous operation of the first compute lane at a first time;
  in response to determining to transition from the first compute lane to the second compute lane based on the anomaly condition, determine whether to accept or reject the second motion trajectory based on a comparison of the first motion trajectory and the second motion trajectory over a prefix time horizon after the first time,
  wherein the second motion trajectory is accepted if the second motion trajectory is within an acceptable deviation threshold from the first motion trajectory, and wherein the second motion trajectory is rejected if the second motion trajectory is not within the acceptable deviation threshold from the first motion trajectory, the acceptable deviation threshold indicating that the second motion trajectory is within an acceptable bound of the first motion trajectory over the prefix time horizon; and
control the autonomous vehicle in accordance with the second motion trajectory.

2. The AV control system of claim 1, wherein the comparison of the first motion trajectory and the second motion trajectory is performed at each timestamp within the prefix time horizon, the prefix time horizon defining an initial portion of each of the first motion trajectory and the second motion trajectory.

3. The AV control system of claim 1, wherein the one or more processors are further configured to control the autonomous vehicle to stop based on the second motion trajectory being rejected one or more times.

4. The AV control system of claim 1, wherein providing the data describing the first motion trajectory to a second motion planner comprises transforming the data describing the first motion trajectory from a first local frame of the first motion planner to a second local frame of the second motion planner.

5. The AV control system of claim 4, wherein transforming the data describing the first motion trajectory from the first local frame of the first motion planner to the second local frame of the second motion planner comprises:
  (i) transforming the data describing the first motion trajectory from the first local frame to an intermediate frame; and
  (ii) transforming the data describing the first motion trajectory from the intermediate frame to the second local frame.

6. The AV control system of claim 5, wherein the intermediate frame comprises a vehicle frame oriented relative to a current pose of the autonomous vehicle.

7. The AV control system of claim 1, wherein generating the second motion trajectory by the second motion planner comprises concatenating a prefix portion of the first motion trajectory to a trajectory generated by the second motion planner, wherein the trajectory generated by the second motion planner begins at an end of the prefix portion.

8. The AV control system of claim 1, wherein the data describing the first motion trajectory comprises position, velocity, and acceleration data over a full time horizon of the first motion trajectory.

9. The AV control system of claim 1, wherein the data describing the first motion trajectory comprises a path match data structure, the path match data structure comprising data descriptive of global path data utilized by the first motion planner in generating the first motion trajectory, the global path data defining a path relative to a global map.

10. The AV control system of claim 1, wherein the first compute lane comprises one or more first processors of the one or more processors, and the second compute lane comprises one or more second processors of the one or more processors, the one or more second processors being independent from the one or more first processors.

11. The AV control system of claim 1, wherein the first compute lane utilizes a first set of inputs and the second compute lane utilizes a second set of inputs, wherein the first set of inputs is different from the second set of inputs.

12. A computer-implemented method, comprising:
obtaining data describing a first motion trajectory from a first motion planner configured to output the first motion trajectory at a first planning cycle, the first motion planner associated with a first compute lane;
providing the data describing the first motion trajectory to a second motion planner associated with a second compute lane;
generating a second motion trajectory by the second motion planner at a second planning cycle based on the data describing the first motion trajectory from the first motion planner;
controlling a vehicle in accordance with the first motion trajectory;
determining to transition from the first compute lane to the second compute lane based on an anomaly condition indicative of anomalous operation of the first compute lane at a first time;
in response to determining to transition from the first compute lane to the second compute lane based on the anomaly condition, determining whether to accept or reject the second motion trajectory based on a comparison of the first motion trajectory and the second motion trajectory over a prefix time horizon after the first time,
wherein the second motion trajectory is accepted if the second motion trajectory is within an acceptable deviation threshold from the first motion trajectory, and wherein the second motion trajectory is rejected if the second motion trajectory is not within the acceptable deviation threshold from the first motion trajectory, the acceptable deviation threshold indicating that the second motion trajectory is within an acceptable bound of the first motion trajectory over the prefix time horizon; and
controlling the vehicle in accordance with the second motion trajectory.

13. The computer-implemented method of claim 12, wherein providing the data describing the first motion trajectory to a second motion planner comprises transforming the data describing the first motion trajectory from a first local frame of the first motion planner to a second local frame of the second motion planner.

14. The computer-implemented method of claim 13, wherein transforming the data describing the first motion trajectory from the first local frame of the first motion planner to the second local frame of the second motion planner comprises:
  (i) transforming the data describing the first motion trajectory from the first local frame to an intermediate frame; and
  (ii) transforming the data describing the first motion trajectory from the intermediate frame to the second local frame.

15. The computer-implemented method of claim 12, wherein the data describing the first motion trajectory comprises a path match data structure, the path match data structure comprising data descriptive of global path data utilized by the first motion planner in generating the first motion trajectory, the global path data defining a path relative to a global map.

16. An autonomous vehicle, comprising:
a first compute lane, the first compute lane comprising a first motion planner configured to output a first motion trajectory at a first planning cycle;
a second compute lane, the second compute lane comprising a second motion planner configured to output a second motion trajectory; and
one or more processors configured to:
obtain data describing the first motion trajectory from the first motion planner;

provide the data describing the first motion trajectory to the second motion planner;
generate the second motion trajectory by the second motion planner at a second planning cycle based on the data describing the first motion trajectory from the first motion planner;
control a vehicle in accordance with the first motion trajectory;
determine to transition from the first compute lane to the second compute lane based on an anomaly condition indicative of anomalous operation of the first compute lane at a first time;
in response to determining to transition from the first compute lane to the second compute lane based on the anomaly condition, determine whether to accept or reject the second motion trajectory based on a comparison of the first motion trajectory and the second motion trajectory over a prefix time horizon after the first time,
wherein the second motion trajectory is accepted if the second motion trajectory is within an acceptable deviation threshold from the first motion trajectory, and wherein the second motion trajectory is rejected if the second motion trajectory is not within the acceptable deviation threshold from the first motion trajectory, the acceptable deviation threshold indicating that the second motion trajectory is within an acceptable bound of the first motion trajectory over the prefix time horizon; and
control the autonomous vehicle in accordance with the second motion trajectory.

* * * * *